United States Patent
Duerrwaechter et al.

(10) Patent No.: US 10,094,345 B2
(45) Date of Patent: Oct. 9, 2018

(54) FUEL CONSUMPTION-MEASURING SYSTEM AND METHOD FOR MEASURING THE FUEL CONSUMPTION OF AN INTERNAL COMBUSTION ENGINE

(71) Applicant: AVL LIST GMBH, Graz (AT)

(72) Inventors: Martin Duerrwaechter, Aachen (DE); Michael Tauch, Frohnleiten (AT); Michael Buchner, Graz (AT)

(73) Assignee: AVL LIST GMBH, Graz (AT)

( * ) Notice: Subject to any disclaimer, the term of this patent is extended or adjusted under 35 U.S.C. 154(b) by 132 days.

(21) Appl. No.: 15/328,062

(22) PCT Filed: Jul. 24, 2015

(86) PCT No.: PCT/EP2015/067040
§ 371 (c)(1),
(2) Date: Jan. 23, 2017

(87) PCT Pub. No.: WO2016/012609
PCT Pub. Date: Jan. 28, 2016

(65) Prior Publication Data
US 2017/0218893 A1    Aug. 3, 2017

(30) Foreign Application Priority Data

Jul. 24, 2014 (AT) ................................. A 590/2014

(51) Int. Cl.
*F02M 37/00* (2006.01)
*F02D 33/00* (2006.01)
(Continued)

(52) U.S. Cl.
CPC ..... *F02M 37/0052* (2013.01); *F02D 41/3005* (2013.01); *F02M 31/20* (2013.01);
(Continued)

(58) Field of Classification Search
CPC .............................................. F02D 2200/0625
See application file for complete search history.

(56) References Cited

U.S. PATENT DOCUMENTS 3,633,420 A    1/1972  Holzem
3,973,536 A    8/1976  Zelders
(Continued)

FOREIGN PATENT DOCUMENTS

CN    1981131 A    6/2007
CN    101631951 A  1/2010
(Continued)

*Primary Examiner* — Leslie J Evanisko
*Assistant Examiner* — Rueben Parco, Jr.
(74) *Attorney, Agent, or Firm* — Norman B. Thot (57) ABSTRACT

A fuel consumption-measuring system includes a feed line, a first pump which pumps fuel from a tank via the feed line to a consumer, a fuel consumption-measuring device in the feed line, a first return line which branches off at the consumer and opens into the feed line between the fuel consumption-measuring device and the consumer, a second return line which branches off from the feed line between the first pump and the fuel consumption-measuring device which opens into the tank, a branch which leads from the feed line into the second return line, a heat exchanger, and a flow device arranged in the first and second return lines. The flow device provides an equal volume flow at an opening of the first return line into the feed line and at the branch leading from the feed line into the second return line.

17 Claims, 3 Drawing Sheets

(51) Int. Cl.
   *G01F 1/00*   (2006.01)
   *G01F 9/00*   (2006.01)
   *G01F 9/02*   (2006.01)
   *F02D 41/30*   (2006.01)
   *F02M 31/20*   (2006.01)
   *F02M 37/04*   (2006.01)

(52) U.S. Cl.
   CPC .... *F02M 37/0023* (2013.01); *F02M 37/0047* (2013.01); *F02M 37/045* (2013.01); *G01F 9/001* (2013.01); *G01F 9/023* (2013.01); *Y02T 10/126* (2013.01)

(56) References Cited

U.S. PATENT DOCUMENTS

| | | | |
|---|---|---|---|
| 4,411,239 A | | 10/1983 | Kelch |
| 4,498,334 A | * | 2/1985 | Riesenberg ............... G01F 9/00 73/114.52 |
| 4,539,965 A | | 9/1985 | Soltau |
| 5,284,120 A | | 2/1994 | Fukushima et al. |
| 5,708,201 A | | 1/1998 | Kaub |
| 2006/0201244 A1 | | 9/2006 | Metzler et al. |
| 2006/0277982 A1 | * | 12/2006 | Christian .............. F02D 33/003 73/114.52 |
| 2010/0019069 A1 | | 1/2010 | Grossner et al. |

FOREIGN PATENT DOCUMENTS

| | | | |
|---|---|---|---|
| CN | 103883445 A | 6/2014 | |
| DE | 37 07 271 C1 | 5/1988 | |
| EP | 0059303 A2 * | 9/1982 | ............. F02M 31/20 |
| GB | 2 202 034 A | 9/1988 | |
| JP | 59-144165 U | 9/1984 | |

* cited by examiner

FUEL CONSUMPTION-MEASURING SYSTEM AND METHOD FOR MEASURING THE FUEL CONSUMPTION OF AN INTERNAL COMBUSTION ENGINE

CROSS REFERENCE TO PRIOR APPLICATIONS

This application is a U.S. National Phase application under 35 U.S.C. § 371 of International Application No. PCT/EP2015/067040, filed on Jul. 24, 2015 and which claims benefit to Austrian Patent Application No. A 590/2014, filed on Jul. 24, 2014. The International Application was published in German on Jan. 28, 2016 as WO 2016/012609 A1 under PCT Article 21(2).

FIELD

The present invention relates to a fuel consumption-measuring system having a fuel feed line via which a first fuel pump, via which fuel can be fed from a fuel tank, can be fluidly connected to a consumer, a fuel consumption-measuring device which is arranged in the fuel feed line, a first fuel return line which branches off at the consumer and opens into the fuel feed line between the fuel consumption-measuring device and the consumer, a second fuel return line which branches off from the fuel feed line between the first fuel pump and the fuel consumption-measuring device and opens into the fuel tank, and a heat exchanger via which the fuel from the second fuel return line extracts heat from the fuel of the first fuel return line. The present invention also relates to a method for measuring the fuel consumption of an internal combustion engine via the fuel consumption-measuring system in which fuel is fed from a tank to a consumer via a first fuel pump, wherein a fuel consumption-measuring device measures the volume flow of the fuel fed.

BACKGROUND

Such systems typically consist of a module which performs the actual measurement of the fuel flow and, in case of measuring systems with fuel recirculation, in an additional conditioning module via which it is set that the fuel recirculated from the engine is recirculated into the feed line at a position downstream of the device for flow measurement. The fuel consumption-measuring device in particular consists of a flow meter as is described in DE-AS 1 798 060. The flow meter is an electronically controlled flow measuring device with an inlet and an outlet, between which a rotary displacer in the form of a gear pump, as well as a piston provided in a line parallel to the displacer, are arranged in a measuring chamber. The displacement of the piston is measured in the measuring chamber by an optical sensor to determine the flow volume. The rotational speed of the gear pump is continuously readjusted on the basis of this signal so that the piston is always returned to its initial position, if possible. The flow in a predefined time interval is calculated from the number of rotations or partial rotations of the gear pump measured by an encoder and the known feed volume of the gear pump during one rotation. Return flows from the engine cannot, however, be measured with such systems.

These systems for fuel consumption measurement with a conditioning means are arranged, for example, upstream of a high-pressure fuel pump of a common rail system with a plurality of injection valves. These are closed circuits. It is alternatively basically conceivable to provide a return line to the tank and to arrange a second flow meter therein so that the fuel consumption can be calculated from the difference between the two flow meters. It has been found, however, that such systems do not provide sufficiently exact results due to the very large volumes returned which may possibly be ten times and in extreme cases up to one hundred times the fuel consumption.

Systems for fuel consumption measurement have therefore become known, such as is disclosed, for example, in DE 197 81 795 T1. The system described therein merely comprises one flow meter that is arranged in the feed line leading from the tank to the consumer. A line branches upstream of the flow meter, which leads back to the tank and in which a pressure regulating relief valve is arranged via which the pressure in the feed line can be adjusted. A first return line branches immediately upstream of the consumer and opens into the feed line downstream of the flow meter. Both return lines are combined in a heat exchanger so that the warmer fuel from the first return line is cooled by the colder fuel from the second return line, so that the temperature of the fuel fed from the first return line approximately corresponds to the temperature of the fuel in the feed line. A pressure reducer is additionally provided in the feed line upstream of the opening of the first return line and downstream of the flow meter. Another feed pump is arranged downstream of the opening of the first return line. The flow meter measures the fuel consumption with good accuracy since the fuel pressure and the temperature in the second recirculation circuit and in the first recirculation circuit can be maintained to be substantially equal.

Similar solutions are described in EP 0122105 A1 and in WO 2005/005935 A1.

Problems occur in operational states, however, in which the returned fuel flow is larger than the fed fuel flow. Such a state may occur, for example, when a Diesel engine is started or during the transition from a full load to idle running. The pressure reducer arranged in the feed line prevents a return flow towards the tank, whereby an undesired increase in pressure is caused in the return line. This influences the performance of the internal combustion engine and may even result in damage to aggregates.

It is also common for modern internal combustion engines to use a pump regulation in which the feed volume is adjusted to the expected fuel consumption in order to save energy. The regulation of the pump, however, causes pressure changes in the feed line, wherein the pressure regulating valves at the same time try to create a constant pressure in the feed line and the return line during the measurement. This influences the internal combustion engine which may result in a superposition with the pressure regulation of the internal combustion engine, which may lead to errors in engine management.

SUMMARY

An aspect of the present invention is to provide a fuel consumption-measurement system, as well as a method for measuring the fuel consumption of an internal combustion engine, which avoid the aforementioned problems. An additional aspect of the present invention is to make it possible to perform an exact consumption measurement without having to maintain a constant pressure in the system while also allowing return flows through the flow meter.

In an embodiment, the present invention provides a fuel consumption-measuring system which includes a fuel feed line, a first fuel pump configured to pump fuel from a fuel tank via the fuel feed line to a consumer, a fuel consumption-measuring device arranged in the fuel feed line, a first fuel return line arranged to branch off at the consumer and to open into the fuel feed line at an opening between the fuel consumption-measuring device and the consumer, a second fuel return line arranged to branch off from the fuel feed line between the first fuel pump and the fuel consumption-measuring device and to open into the fuel tank, a branch arranged to lead from the fuel feed line into the second fuel return line, a heat exchanger configured so that fuel from the second fuel return line extracts heat from the fuel of the first fuel return line, and at least one equal volume flow device arranged in the first fuel return line and in the second fuel return line. The at least one equal volume flow device is configured to provide an equal volume flow at the opening of the first fuel return line into the fuel feed line and at the branch leading from the fuel feed line into the second fuel return line.

BRIEF DESCRIPTION OF THE DRAWINGS

The present invention is described in greater detail below on the basis of embodiments and of the drawings in which.

DETAILED DESCRIPTION

In an embodiment of the fuel consumption-measuring system, a device is arranged in the first fuel return line and in the second fuel return line by which an equal volume flow can be adjusted at an opening of the first fuel return line into the fuel feed line and at a branch from the fuel feed line into the second fuel return line.

In an embodiment of the method for measuring the fuel consumption, during the measurement of the fuel consumption, the volume flow in a first fuel return line, via which fuel flows from the consumer back to a feed line between the consumer and the fuel consumption-measuring device, and in a second fuel return line, via which fuel is fed from the feed line back to the tank, is regulated to the same measured value. It is thus achieved that the system no longer influences the interaction between the fuel feeding and the engine, in particular the performance and the regulation of the internal combustion engine. This means that the measurements are performed on the internal combustion engine under the same conditions as if no measuring system were used. The pressure changes caused by the regulation of the pump are accordingly not superposed with the regulations by the measuring system. Return flows through the flow meter are also possible and can be detected. Since no subsequent regulating units are required downstream of the flow meter, the flow meter can be arranged close to the consumer so that the external hydraulic volume is decreased, whereby the measuring results are also improved.

In an embodiment of the present invention, a flow meter can, for example, be arranged in the second fuel return line and in the first fuel return line, respectively, to create equal volume flows from the fuel feed line into the second fuel return line and from the first fuel return line into the fuel feed line, wherein both flow meters are electrically connected to a volume flow regulating unit. It can be determined via these two flow meters whether the volume flows in both return lines have been set to the same value. It is thereby provided that the fuel measurement does not influence the actual present fuel consumption.

A regulating valve is also arranged in the second fuel return line to generate equal volume flows in the fuel return lines, the regulating valve being controllable via the volume flow regulating unit which is connected to the flow meters. The method provides that the volume flow of the fuel in the first fuel return line is measured by a first flow sensor, that the volume flow in the second fuel return line is measured by a second flow sensor, and that a regulating valve in the second fuel return line is regulated by a volume flow regulating unit so that the volume flow in the second fuel return line is regulated to the same value as the volume flow in the first fuel return line. This means that, depending on the measured values of the flow meters, the regulating valve regulates the volume flow in the second return line to the same value as in the first return line so that a balance is achieved between the volume flows led to the feed line and the volume flows taken from the feed line. The actual fuel consumption is accordingly measured at the flow measurement device. Such a conditioning module is simple to produce.

A second fuel pump can advantageously be arranged in the first fuel return line. The pressure in the first return line can be adjusted via the second fuel pump to values that correspond to those obtained without a measuring system.

The second fuel pump can, for example, be electrically connected to a pressure regulating unit which is electrically connected to a pressure pickup arranged in the first fuel return line upstream of the heat exchanger. With regard to the method, the pressure of the fuel is thus measured in the first fuel return line by a pressure pickup, and a second fuel pump downstream of the heat exchanger and upstream of the opening of the first fuel return line is regulated via a pressure regulating unit so that a constant pressure prevails in the first fuel return line. The pressure prevailing in the first return line during the measurement is thus regulated to an average pressure in the first return line outside the measuring periods so that, during the measurements, a constant pressure always prevails in the return line. Pressure variations in the feed line are thus not superposed.

In an alternative embodiment of the present invention, the second fuel pump can, for example, be operated at a constant rotational speed and be connected in a circuit with a regulating valve, wherein the regulating valve and the first flow meter are connected to the pressure regulating unit. Such a design simplifies both pressure and volume flow regulation, in particular with small flows. Such non-continuously regulatable pumps can also be produced at significantly lower cost.

The second fuel pump is here advantageously arranged upstream of the heat exchanger and the regulating valve is arranged in a circuit line that branches from the fuel return line downstream of the heat exchanger and opens in the fuel return line downstream of the flow meter and upstream of the fuel pump. The pressure of the fuel can, for example, be regulated in the first fuel return line via a regulating valve arranged in the circuit line together with a constant-speed second fuel pump, and via a pressure regulating unit so that a constant pressure prevails in the region of the opening of the first fuel return line. In this embodiment, the pressure in the region of the opening of the first return line during the measurement is also regulated to an average pressure in the first return line outside the measuring times so that a constant pressure always prevails in the return line during measurement. Pressure variations in the feed line are thus not superposed.

It can be advantageous for the first flow meter and the second fuel pump to be arranged downstream of the heat exchanger in the first fuel return line, and the second flow meter and the regulating valve to be arranged upstream of the heat exchanger in the second fuel return line. The devices for regulating the volume flows are thus located on the cold side of the heat exchanger at which approximately equal temperatures prevail. The temperature influence on the regulation is thus significantly reduced.

In an embodiment of the present invention, the second flow meter can, for example, be arranged downstream of the heat exchanger in the second fuel return line. In this embodiment, the devices for regulating the volume flows are both located on the warm side of the heat exchanger so that little temperature influence also exists in this case.

In an embodiment of the present invention, a rotational displacer can, for example, be formed in the fuel consumption-measuring device, and a measuring chamber can, for example, be formed in a bypass line bypassing the rotational displacer, in which line a piston is arranged, wherein the rotational displacer is adapted to be driven as a function of the displacement of the piston. Such flow meters work very precisely and correctly indicate even short-time consumption variations.

In order to switch between consumption measurement and normal operation of the internal combustion engine in a manner which is as simple as possible, and to be able to use the system inline in a driving vehicle, a bypass valve is arranged in the first fuel return line via which the fuel from the first fuel return line may be guided selectively to the heat exchanger or back to the tank via a regulating valve. In the context of the method of the present invention, this means that, outside the measurement times, a fuel flow from the first fuel return line is returned into the tank via a bypass valve through a bypass line while bypassing the heat exchanger, and that the regulating valve closes the second fuel return line.

In an embodiment of the method for measuring fuel consumption of the present invention, the temperature of the fuel in the first fuel return line can, for example, be cooled down upstream of the opening into the fuel feed line to a temperature near the temperature of the fuel in the tank by making the heated fuel in the first fuel return line and the not-heated fuel in the second fuel return line serve as heat exchange media of a heat exchanger. The temperature of the fuel leaving the feed line and the temperature of the fuel returned to the feed line are thus adjusted to about equal values so that no mass flow differences due to differing temperatures occur. A heating up of the fuel in the feed line or in the tank is thereby avoided.

A fuel consumption-measuring system as well as a method for measuring the fuel consumption are thus provided by which temporally resolved flow processes can be detected with high accuracy and continuously. Errors in flow data calculation are also avoided if oscillations of flow occur, irregular feed volumes of the pump exist, or if strong pulsations exist that possibly cause a return flow. No additional sensors are thereby required to determine or transmit external data. The system accordingly operates independently.

The fuel consumption-measuring system and the method for measuring the fuel consumption of the present invention is illustrated in the drawings and will be described hereunder with reference thereto.

Figure 1:
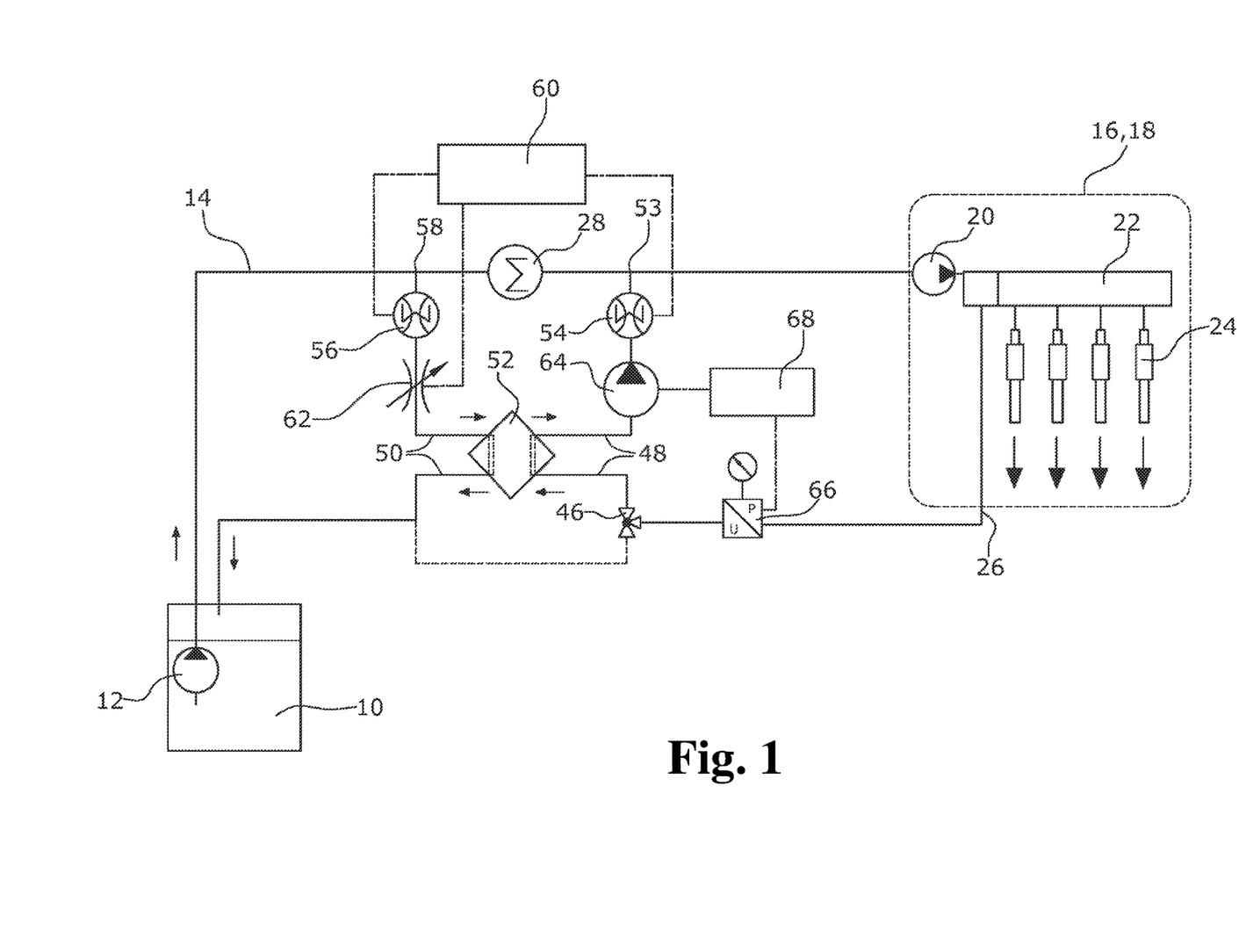
FIG. 1 shows a flow chart of a fuel consumption-measuring system of the present invention.

The fuel consumption-measuring system shown in FIG. 1 consists of a tank 10 in which fuel is stored. A first fuel pump 12 pumps fuel from the tank 10 into a first fuel feed line 14. The fuel feed line 14 leads to a consumer 16 which in the present embodiment is designed as an internal combustion engine 18 with a common rail injection system. The fuel feed line 14 accordingly leads to a high-pressure pump 20 via which the fuel is fed into a common rail distributor pipe 22 and is compressed. The distributor pipe 22 is in fluid communication with injection valves 24 via which fuel is injected into the combustion chambers of the internal combustion engine 18.

Larger quantities of fuel are typically fed in these systems than are actually injected via the injection valves 24 so that a first fuel return line 26 branches from the distributor pipe 22, the first fuel return line 26 leading back to the tank 10. The recirculated fuel quantities can here be a multiple of the injected fuel quantities.

Figure 2:
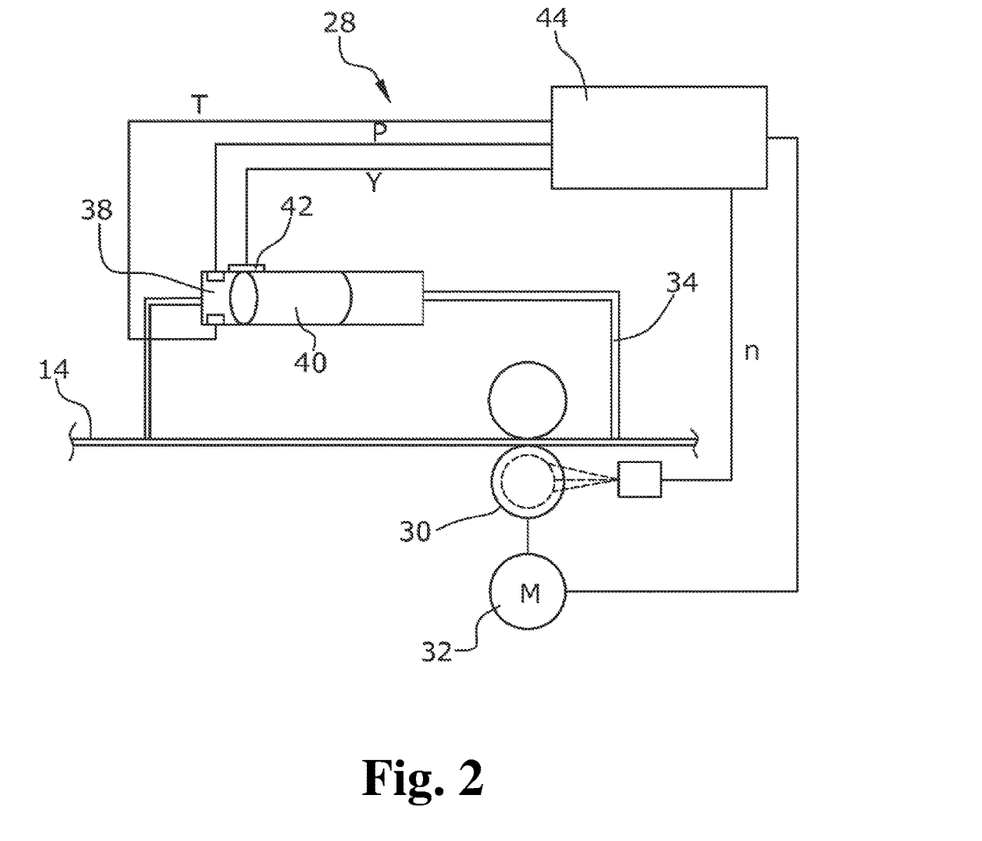
FIG. 2 shows a schematic illustration of a fuel consumption-measuring device as it is used in the fuel consumption-measuring system.

A fuel consumption-measuring device 28 is arranged in the fuel feed line 14 to measure fuel consumption. The fuel consumption-measuring device 28 may in particular be configured as shown in FIG. 2.

A rotary displacer 30, for example, in the form of a double gear pump, is arranged in the fuel feed line 14 for measuring purposes. The rotary displacer 30 is driven by a drive motor 32 via a clutch or a transmission.

Upstream of the rotary displacer 30, a bypass line 34 is branched from the fuel feed line 14, which bypass line 34 opens into the fuel feed line 14 again downstream of the rotary displacer 30. A piston 40, which is arranged to be freely displaceable in a measuring chamber 38, is arranged in bypass line 34, the piston 40 having the same specific weight as the measured fluid, i.e., the fuel, so that the piston 40 moves in an inertia-free manner together with the fuel corresponding to the volume flow present in the bypass line 34. The measuring chamber 38 has a cylindrical shape and has an inner diameter that substantially corresponds to the outer diameter of the piston 40. If a change in volume flow occurs in the fuel feed line 14, this first causes a displacement of the piston 40. This displacement is measured by a path sensor 42, and the measured values are supplied to a control unit 44 which records the values from the path sensor 42 and transmits corresponding signals to the drive motor 32 which is controlled so that the piston 40 is always moved back to its defined initial position, i.e., the volume flow is always discharged as exactly as possible via the rotary displacer 30. This means that, upon a displacement of the piston 40 to the right, the rotational speed of the rotary displacer 30 is increased in dependence on the quantity of the displacement, and vice versa. The displacement of the piston 40 or the volume displaced by the piston 40 in the measuring chamber 38 is thereby converted by a transfer function into a desired feed volume of the rotary displacer 30 or a rotary speed of the drive motor 32, and the drive motor 32 is energized correspondingly.

In the system described so far, the overall fuel flow would, however, be measured, including the recirculated flow. To avoid this and to actually measure only the injected quantity of fuel at the fuel consumption-measuring device 28, two separate fuel return lines are used during the measuring times. First, a bypass valve 46 is arranged in the first fuel return line 26, via which bypass valve 46 the fuel flow can flow from the first fuel return line 26 into a second branch 48 of the first fuel return line 26 that opens into the fuel feed line 14 downstream of the fuel consumption-measuring device 28. Secondly, a second fuel return line 50 branches from the fuel feed line 14 upstream of the fuel consumption-measuring device 28, which fuel feed line 14 leads back to the tank 10.

The two fuel flows of the first fuel return line 26 and the second fuel return line 50 are in heat exchanging contact with each other via a heat exchanger 52. This means that the fuel flow from the first fuel return line 26, recirculated and heated via the consumer 16, transfers heat to the colder fuel flow from the second fuel return line 50 so that the temperature of the fuel getting into the fuel feed line 14 from the first fuel return line 26 substantially corresponds to the temperature of the fuel flow branched from the fuel feed line 14 via the second fuel return line 50.

Devices are further arranged in the first fuel return line 26 and in the second fuel return line 50, via which it is possible to adjust the volume flows in both the first fuel return line 26 and in the second fuel return line 50 to equal measured values, whereby, as a consequence, only the fuel actually consumed is measured at the fuel consumption-measuring device 28. These devices are specifically formed by two flow meters 54, 56, a first flow meter 54 being arranged in the first fuel return line 26 between the heat exchanger 52 and the opening 53 of the first fuel return line 26, and the second flow meter 56 being arranged in the second fuel return line 50 between the branch 58 from the fuel feed line 14 and the heat exchanger 52. Both the first flow meter 54 and the second flow meter 56, which may be provided, for example, as simple turbine counters, are electrically connected to a volume flow regulating unit 60. Via this volume flow regulating unit 60, a regulating valve, which is arranged between the second flow meter 56 and the heat exchanger 52 in the second fuel return line 50, is controlled so that an equal volume flow is measured in both the first fuel return line 26 and in the second fuel return line 50 during the measuring times. This regulating valve can be provided, for example, as a pressure regulator or as an adjustable throttle.

In order to additionally provide that no changed pressure conditions exist compared to normal operation without measuring the fuel consumption, but that existing pressure pulsations or changes caused by adjustments of the high-pressure pump 20 or the first fuel pump 12 are also correctly represented during the measuring times, a second fuel pump 64, which is arranged in the first fuel return line 26 between the heat exchanger 52 and the first flow meter 54, is used to adjust the pressure in the first fuel return line 26 to a value that corresponds to an average value of the pressure in the first fuel return line 26 outside the measuring times. To be able to control the second fuel pump 64 accordingly, a pressure pickup 66 is arranged in the first fuel return line 26 upstream of the bypass valve 46, which pressure pickup 66 is connected to a pressure regulating unit 68 via which the second fuel pump 64 is regulated. Since the system is open to the fuel feed line 14, besides the equal volume flow, a substantially equal pressure will prevail at the branch 58 to the second fuel return line 50 and at the opening 53 of the first fuel return line 26. A fuel flow thus exits from the fuel feed line 14 upstream of the fuel consumption-measuring device 28 which, due to the heat exchanger 52, substantially corresponds in temperature and, due to the regulation by the regulating valve 62 and the first flow meter 54 and the second flow meter 56, also in pressure and in volume flow, to the fuel flow that is recirculated to the fuel feed line 14 upstream of the fuel consumption-measuring device 28 via the first fuel return line 26, which results in the fact that the measured values of the fuel consumption-measuring device 28 are not influenced by the feed and the discharge of fuel.

Figure 3:
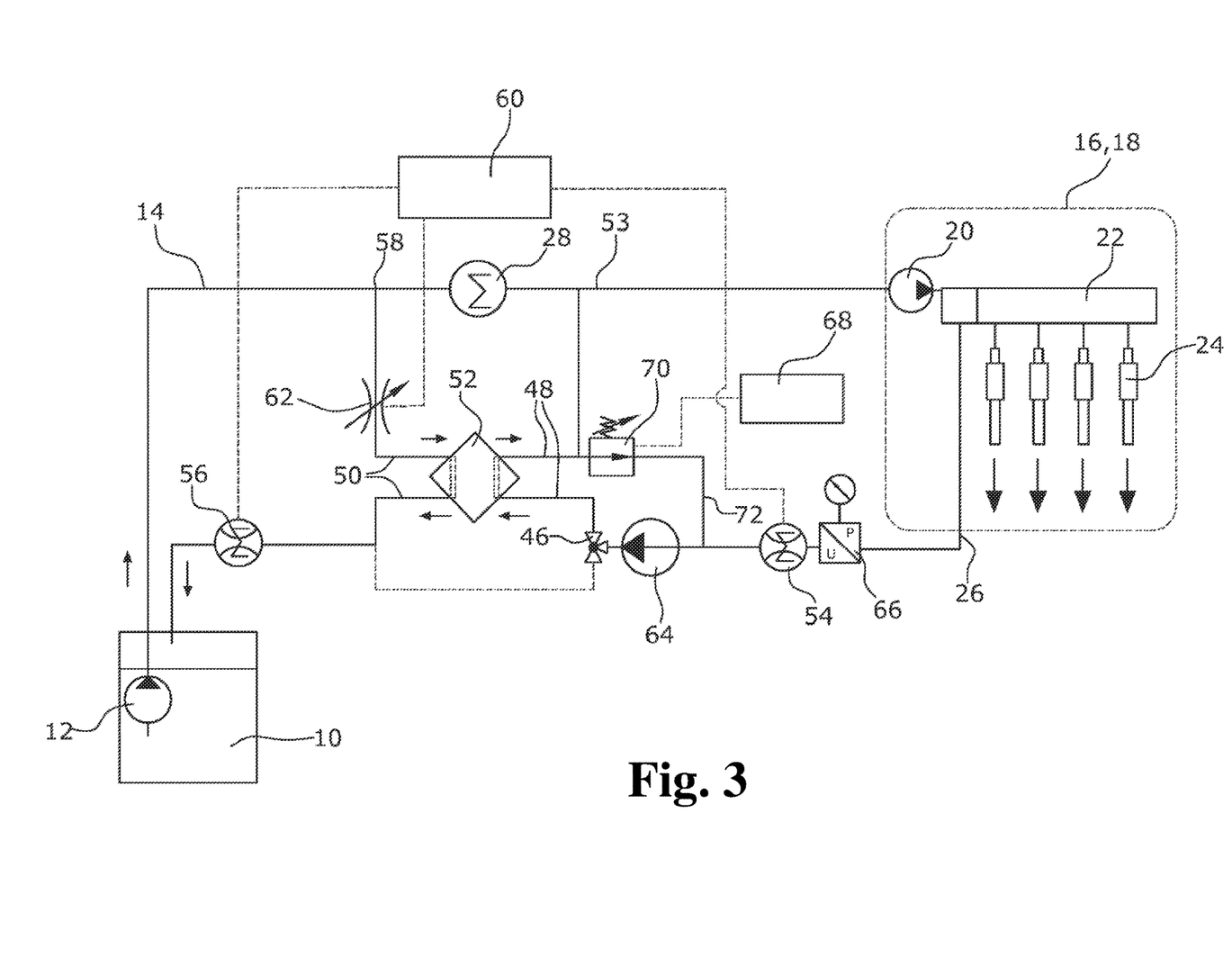
FIG. 3 shows a flow chart of a fuel consumption-measuring system of the present invention which is slightly modified compared to FIG. 1.

FIG. 3 shows an alternative possibility to regulate the volume flows and pressures. A non-adjustable fuel pump 64 is used compared to the embodiment in FIG. 1. Like the first flow meter 54, this non-adjustable fuel pump 64 is arranged in the first fuel return line 26 upstream of the heat exchanger 52. The second flow meter 56 arranged in the second fuel return line 50 is also located on the warm side, i.e., downstream of the heat exchanger 52. To be able to also maintain the volume flow flowing into the second fuel return line 50 at the branch 58 and the volume flow fed at the opening 53 of the fuel feed line 14 equal with the non-adjustable fuel pump 64, a circuit line 72 is branched from the first fuel return line 26 upstream of the opening 53, in which circuit line 72 a regulating valve 70 is arranged which opens into the first fuel return line 26 again between the first flow meter 54 and the non-adjustable fuel pump 64 positioned downstream thereof. The regulating valve 70 is connected to a pressure regulating unit 68 via which it is possible to regulate the volume flow recirculated in the circuit line 72 and, thus, also the pressure of the fuel recirculated via the first fuel return line 26. The regulating valve 62 arranged between the second flow meter 56 and the heat exchanger 52 in the second fuel return line 50 is controlled via the volume flow regulating unit 60 so that an equal volume flow is measured in both the first fuel return line 26 and the second fuel return line 50 during the measuring times. Since the system is open to the fuel feed line 14, besides the equal volume flow, a substantially equal pressure will prevail at the branch 58 to the second fuel return line 50 and at the opening 53 of the first fuel return line 26.

This embodiment also provides that no changed pressure conditions prevail during the measuring operation compared to normal operation without measurement of the fuel consumption by adjusting the pressure in the first fuel return line 26 via the pressure regulating unit 68 by the regulating valve 70 in the circuit line 72 to a value that corresponds to an average value of the pressure in the first fuel return line 26 outside the measuring times.

Both alternatives provide that the fuel actually consumed is measured accurately at the fuel consumption-measuring device 28 without any installations being present in the fuel feed line 14 that would cause pressure loss or influence the flow in any other way. Return flows are therefore registered at the fuel consumption-measuring device 28 as they are generated, for example, due to the fact that the recirculated quantity of fuel exceeds the quantity of fuel fed, as may occur when a Diesel engine is started or during the transition from full load to idle running of the engine. Pulsations of the high-pressure pump are also correctly represented. An influence on the performance of the internal combustion engine caused by the measurements is excluded since conditions are provided that are equal to those in normal operation. Very accurate, temporally-resolved measured values of the fuel consumption are thus obtained that correspond to the actual fuel consumption values of the internal combustion engine during normal operation outside the measuring times.

It should be clear that the present invention is not limited to the embodiments described, but that various modifications are also possible which fall within the scope of protection of the claims. It is in particular conceivable to use other devices to adjust the equal fuel mass flows in the two fuel return lines. Other flow meters can also be used. Reference should also be had to the appended claims.

What is claimed is:
1. A fuel consumption-measuring system comprising:
a fuel feed line;

a first fuel pump configured to pump fuel from a fuel tank via the fuel feed line to a consumer; a fuel consumption-measuring device arranged in the fuel feed line;

a first fuel return line arranged to branch off at the consumer and to open into the fuel feed line at an opening between the fuel consumption-measuring device and the consumer;

a second fuel return line arranged to branch off from the fuel feed line between the first fuel pump and the fuel consumption-measuring device and to open into the fuel tank;

a branch arranged to lead from the fuel feed line into the second fuel return line;

a heat exchanger configured so that fuel from the second fuel return line extracts heat from the fuel of the first fuel return line; and at least one equal volume flow device arranged in the first fuel return line and in the second fuel return line, the at least one equal volume flow device being configured to provide an equal volume flow at the opening of the first fuel return line into the fuel feed line and at the branch leading from the fuel feed line into the second fuel return line; and a volume flow regulating unit;

wherein, a first flow meter is arranged in the first fuel return line as the at least one equal volume flow device to provide the equal volume flow from the first fuel return line into the fuel feed line, a second flow meter is arranged in the second fuel return line as the at least one equal volume flow device to provide the equal volume flow from the fuel feed line into the second fuel return line, and both the first flow meter and the second flow meter are electrically connected to the volume flow regulating unit.

2. The fuel consumption-measuring system as recited in claim 1, wherein, the volume flow regulating unit is connected to the first flow meter and to the second flow meter, a regulating valve is arranged in the second fuel return line as the at least one equal volume flow device to provide the equal volume flow in the first fuel return line and in the second fuel return line, and the regulating valve is configured to be controlled via the volume flow regulating unit.

3. The fuel consumption-measuring system as recited in claim 2, further comprising a second fuel pump arranged in the first fuel return line.

4. The fuel consumption-measuring system as recited in claim 3, further comprising:

a pressure pickup arranged in the first fuel return line upstream of the heat exchanger; and a pressure regulating unit which is electrically connected to the pressure pickup and to the second fuel pump.

5. The fuel consumption-measuring system as recited in claim 3, further comprising:

a regulating valve, wherein, the regulating valve and the first flow meter are connected to the pressure regulating unit, and the second fuel pump is configured to be operated at a constant rotational speed and is connected with the regulating valve in a circuit.

6. The fuel consumption-measuring system as recited in claim 5, further comprising:

a circuit line arranged to branch from the fuel return line downstream of the heat exchanger and to open into the fuel return line downstream of the flow meter and upstream of the fuel pump, wherein, the second fuel pump is further arranged upstream of the heat exchanger, and the regulating valve is arranged in the circuit line.

7. The fuel consumption-measuring system as recited in claim 3, wherein, the first flow meter and the second fuel pump are arranged downstream of the heat exchanger in the first fuel return line, and the second flow meter and the regulating valve are arranged upstream of the heat exchanger in the second fuel return line.

8. The fuel consumption-measuring system as recited in claim 5, wherein the second flow meter is arranged downstream of the heat exchanger in the second fuel return line.

9. The fuel consumption-measuring system as recited in claim 1, further comprising:

a rotational displacer arranged in the fuel consumption-measuring device;

a bypass line arranged to bypass the rotational displacer;

a measuring chamber formed in the bypass line; and a piston arranged in the bypass line, wherein, the rotational displacer is configured to be driven as a function of a displacement of the piston.

10. The fuel consumption-measuring system as recited in claim 1, further comprising:

a bypass valve arranged in the first fuel return line, the bypass valve being configured to guide fuel from the first fuel return line to the fuel feed line or back to the tank.

11. A method for measuring a fuel consumption of an internal combustion engine with the fuel consumption-measuring system as recited in claim 3, the method comprising:

feeding the fuel from the tank to the consumer via the first fuel pump;

measuring a volume flow of the fuel fed via the fuel consumption-measuring device; and, during the measuring, regulating to equal measuring values a volume flow in the first fuel return line, via which fuel flows from the consumer back to the fuel feed line between the consumer and the fuel consumption-measuring device, and in the second fuel return line via which fuel is fed from the fuel feed line back to the tank.

12. The method for measuring the fuel consumption of an internal combustion engine as recited in claim 11, further comprising:

cooling down a temperature of the fuel in the first fuel return line upstream of the opening into the fuel feed line to be substantially a temperature of the fuel in the tank by using a heated fuel in the first fuel return line and a not-heated fuel in the second fuel return line as heat exchange media of the heat exchanger.

13. The method for measuring the fuel consumption of an internal combustion engine as recited in claim 11, further comprising:

measuring a pressure of the fuel in the first fuel return line via a pressure pickup arranged in the first fuel return line upstream of the heat exchanger; and regulating the second fuel pump downstream of the heat exchanger and upstream of the opening of the first fuel return line via a pressure regulating unit so that a constant pressure prevails in the first fuel return line.

14. The method for measuring the fuel consumption of an internal combustion engine as recited in claim 11, further comprising:

regulating a pressure of the fuel in the first fuel return line via a regulating valve arranged in a circuit line, via the second fuel pump, and via a pressure regulating unit so that a constant pressure prevails in the region of the opening of the first fuel return line, wherein, the circuit line is arranged to branch from the fuel return line downstream of the heat exchanger and to open into the fuel return line downstream of the flow meter and upstream of the fuel pump.

15. The method for measuring the fuel consumption of an internal combustion engine as recited in claim 11, wherein, the measuring of the volume flow of the fuel in the first fuel return line is measured by the first flow meter, the volume flow of the fuel in the second fuel return line is measured by the second flow meter, and the regulating to equal measuring values of the volume flow in the first return line and in the second fuel return line is performed by regulating the regulating valve in the second flow return line by the volume flow regulating unit.

16. The method for measuring the fuel consumption of an internal combustion engine as recited in claim 11, further comprising:

when the measuring is not performed, returning a fuel flow from the first fuel return line into the tank via a bypass valve arranged in the first fuel return line which is configured to guide fuel from the first fuel return line to the fuel feed line or back to the tank, while bypassing the heat exchanger; and closing the second fuel return line with the regulating valve.

17. The method for measuring the fuel consumption of an internal combustion engine as recited in claim 16, further comprising;

during the measuring, constantly regulating a pressure in the first fuel return line to a pressure prevailing when the measuring is not performed.

* * * * *